United States Patent [19]
Schnetger et al.

[11] 4,140,732
[45] Feb. 20, 1979

[54] THERMOPLASTIC RUBBER COMPOSITIONS COMPRISING POLYOLEFIN AND SEQUENTIAL E/P OR EPDM

[75] Inventors: Jochen Schnetger; Manfred Beck, both of Odentahl; Günter Marwede; Gottfried Pampus, both of Leverkusen, all of Fed. Rep. of Germany

[73] Assignee: Bayer Aktiengesellschaft, Leverkusen-Bayerwerk, Fed. Rep. of Germany

[21] Appl. No.: 832,897

[22] Filed: Sep. 13, 1977

[30] Foreign Application Priority Data
Sep. 18, 1976 [DE] Fed. Rep. of Germany ....... 2642090

[51] Int. Cl.² ................... C08L 53/00; C08L 23/16
[52] U.S. Cl. ........................ 260/876 B; 260/897 A
[58] Field of Search .................. 260/897 A, 876 B

[56] References Cited
U.S. PATENT DOCUMENTS

| 3,328,480 | 6/1967 | Crawford et al. | 260/876 |
| 3,487,128 | 12/1969 | Okazaki et al. | 260/876 |
| 3,806,558 | 4/1974 | Fischer | 260/897 |
| 3,862,106 | 1/1975 | Fischer | 260/897 |

FOREIGN PATENT DOCUMENTS 958079 5/1964 United Kingdom ..................... 260/876

Primary Examiner—Carman J. Seccuro
Attorney, Agent, or Firm—Connolly and Hutz

[57] ABSTRACT

A mixture of polyolefin resins and partially crosslinked ethylene-propylene sequential polymer and/or ethylene-propylene-diene sequential polymer representing a so-called thermoplastic rubber having improved properties.

8 Claims, No Drawings

THERMOPLASTIC RUBBER COMPOSITIONS COMPRISING POLYOLEFIN AND SEQUENTIAL E/P OR EPDM

This invention relates to thermoplastic rubber compositions consisting of mixtures of a polyolefin resin and an ethylene-propylene rubber (EPM) or an ethylene-propylene terpolymer (EPDM), so-called sequential copolymers being used as the EPM-copolymers or EPDM-terpolymers.

German Offenlegungsschriften Nos. 2,202,706 and 2,202,738 previously described mixtures of crystalline polyolefin resins and ethylene-propylene or ethylene-propylene-diene rubbers which are either partially crosslinked by the addition of vulcanising agents after mixing or are produced with EPM or EPDM which has already been partially crosslinked.

Unfortunately, such mixtures do not satisfy all practical requirements because, in particular, their tensile strength values, their elongation at break values, their tear propagation resistance values and also their hardness values, as measured at 100° C., are still in need of improvement.

It was subsequently found that, by using so-called segment copolymers of ethylene and propylene optionally with another tercomponent in mixtures with polyolefin resins, the technical properties could be considerably improved.

The mixtures according to German Offenlegungsschrift Nos. 2,202,706 and 2,202,738 contain ethylene-propylene or ethylene-propylene-diene rubbers which represent an amorphous, arbitrarily oriented elastomeric polymer. In contrast to the statistical and, hence, amorphous polymers, the sequential polymers to be used in the mixtures in accordance with the present invention are characterised by very high crude strengths. Thus, the crude strengths of standard commercial-grade statistical ethylene/propylene terpolymers are normally in the range from 0.5 MPa to 2.0 MPa, whereas the values for segment polymers are in the range from 8.0 to 20 MPa. The reason for the high strength of the sequential polymers is their partial crystallinity (G. Schreier and G. Peitscher, Z. anal. Chemie 258 (1972) 199). In contrast to statistical ethylene-propylene or ethylene-propylene-diene polymers which are substantially amorphous, crystallinity was detected both by X-ray spectroscopy and also by Raman spectroscopy. The degree of crystallinity correlates both with the ethylene content and also with the crude strength. These sequential segment polymers are commercially available, for example, under the names BUNA AP 407, BUNA AP 307 (EPM) and BUNA AP 447 (EPDM).

The improvement in technical properties by using the sequential copolymers instead of the amorphous copolymers according to German Offenlegungsschrift Nos. 2,202,706 and 2,202,738 in the mixtures with polyolefin resins was most unexpected. Indeed, the mixture could have been expected to lose its elastomeric properties through the presence of another partially crystalline component.

Accordingly, the present invention provides mixtures of either partially crosslinked ethylene-propylene or ethylene-propylene-diene sequential polymers with pololefin resins or uncrosslinked ethylene-propylene or ethylene-propylene-diene sequential polymers with polyolefin resins, the partial crosslinking taking place during or after mixing.

Suitable polyolefin resins are polymers obtained in known manner by the polymerisation of olefins for example, ethylene, propylene, 1-butene, 4-methyl pentene, 1-pentene and similar olefinic monomers. It is preferred to use crystalline polyolefins of propylene or ethylene with low or high density. It is particularly preferred to use an isotactic polypropylene with a high degree of crystallinity. Polypropylene having a density of from 0.90 to 0.92 is especially preferred. Mixtures of different polyolefins may also be used.

Suitable ethylene-propylene copolymers or ethylene-propylene-diene sequential terpolymers are polymers which consist of sequences of ethylene, propylene and optionally another tercomponent, the tercomponent generally being an unconjugated diene for example, 1,4-hexadiene, dicyclopentadiene, alkylidene norbornene, such as methylene norbornene or ethylidene norbornene or cyclooctadiene. In most cases, it is preferred to use dicyclopentadiene or ethylidene norbornene. The sequential terpolymers which are used in accordance with the present invention in the mixtures with the polyolefin resins may have an ethylene content of from 63 to 95 parts by weight, preferably from 70 to 85 parts by weight, a propylene content of from 5 to 37 parts by weight, preferably from 15 to 30 parts by weight, and a tercomponent content of from 0 to 15 parts by weight, preferably from 5 to 10 parts by weight. The terpolymers are further characterised by a crude strength of at least 3 MPa, preferably at least 8 MPa.

Suitable crosslinking agents are peroxidic crosslinking agents, such as aromatic diacyl peroxides and aliphatic diacyl peroxides, peroxides of dibasic acids, ketone peroxides, alkyl peroxide esters, alkyl hydroperoxides, such as diacetyl peroxide, dibenzoyl peroxide, bis-2,4-dichlorobenzoyl peroxide, di-tert.-butyl peroxide, dicumyl peroxide, tert.-butyl perbenzoate, tert.-butyl cumyl peroxide, 2,5-bis-(tert.-butyl-peroxy)-2,5-dimethyl hexane, 2,5-bis-(tert.-butyl-peroxy)-2,5-dimethyl-3-hexine, 4,4,4',4'-tetra-(tert.-butyl-peroxy)-2,2-dicyclohexyl propane, 1,4-bis-(tert.-butyl-peroxyisopropyl)-benzene, 1,1-bis-(tert.-butyl-peroxy)-3,3,5-trimethyl cyclohexane, lauryl peroxide, succinic acid peroxide, cyclohexanone peroxide, tert.-butyl peracetate and butyl hydroperoxide.

In a first alternative embodiment of the invention, partially crosslinked ethylene-propylene or ethylene-propylene-diene sequential terpolymer may be mixed with the polyolefin resin. In order to obtain partial crosslinking, the sequential terpolymer is reacted in a suitable unit with from 0.05 to 10% by weight, based on the sequential terpolymer, and preferably with 0.1 to 2% by weight, of a crosslinking agent, as a result of which partial crosslinking occurs.

In order to obtain partial crosslinking, the EPDM-rubber is mixed with a small quantity of a crosslinking agent and exposed to vulcanisation conditions in suitable units. Vulcanisation should only take place partially, so that the polymer must still be partially soluble. Completely crosslinked polymers, i.e. polymers insoluble in hydrocarbons, are unsuitable for further processing. Vulcanisation may be carried out in standard apparatus, for example in kneaders, roll stands or screw machines. Mixing with the polypropylene after the partial crosslinking step is carried out in the same apparatus as described above.

The reaction temperature is governed by the decomposition temperature of the crosslinking agent used, so that it cannot be exactly defined. In general, the reaction is carried out at temperatures in the range from 150° to 250° C., and preferably at a temperature in the range from 170° to 220° C.

The proportion of polyolefin resin in the mixture amounts to between 10 and 95% by weight, preferably to between 20 and 70% by weight and, with particular preference, to between 30 and 60% by weight.

In the other alternative embodiment of the invention, the sequential copolymer is initially mixed with the polyolefin resin and then partially crosslinked with the crosslinking agent.

To produce the products according to this alternative embodiment, it is possible for example initially to mix the EP-component with the polyolefin. This step may be carried out in kneaders, on mixing rolls or in self-cleaning multiple-shaft screws. The two components may also be mixed in the form of powders or granulates in high-speed mixers or other stirring units.

This mixture is then partially vulcanised in a kneader with addition of the required quantity of crosslinking agent. Internal mixers, mixing rolls and multiple-shaft screws may be used for this purpose. Crosslinking may also be carried out in conventional vulcanisation presses or in salt baths, UHF-installations or superheated steam ducts. These process steps may be carried out continuously or in batches, depending upon the particular type of unit used. The two components may also be simultaneously mixed with the crosslinker. Another variant is to add the crosslinker in partial batches. In this case, an initial batch of, for example, 20 to 30% of the crosslinking agent is immediately added and the rest is added in 2 to 4 partial batches. This process may be carried out both in batches (internal mixer) and also continuously (screw).

The quantity of crosslinker used and the temperatures applied are the same as in the first alternative.

The mixtures according to the invention are thermoplastic rubber compositions which may be processed into shaped article, for example by moulding or extrusion. In cases where these mixtures are used, there is no need for the vulcanisation step which has to be carried out after the shaping or forming step in the case of conventional rubber polymers. Examples of shaped articles are fender covers, manometer housings, seat shells, visors and dashboards.

EXAMPLES 1 TO 3 WITH COMPARATIVE EXAMPLES 4 AND 5

| Component Composition | Parts by weight |
|---|---|
| Ethylene/propylene rubber | 60 |
| Isotactic polypropylene | 40 |
| 1,3-bis-(tert.-butyl-peroxyisopropyl)-benzene | 0.3 |
| Stabiliser - trinonyl phenyl phosphite | 1.0 |

Production of the mixture in a GK 2 kneader (volume 2.4 l)

| | |
|---|---|
| Temperature (° C.) | 150 |
| Friction | 1 : 1.15 |
| Rotational speed (rpm) | 40 |
| Filling (%) | 110 |
| Mixing time (mins.) | 6 |
| Batch temperature (° C.) | 220 |

| Mixing sequence | |
|---|---|
| Everything apart from stabiliser (mins) | 0 |
| Stabiliser (mins) | 5 |
| Emptying (mins) | 6 |

| Homogenisation in laboratory mixing rolls (200 mm roll diameter, 450 mm working width) | Parts by weight |
|---|---|
| Temperature (° C.) | cold |
| Rotational speed (rpm) | 24 |
| Friction | 1 : 1.15 |
| Rough sheet formation (mins.) | immediate |
| Homogenisation time (mins.) | 0.5 |
| Batch temperature (° C.) | 155 |
| Total mixing time (mins.) | 6.5 |

Table 1
Characterisation of the ethylene-propylene rubbers used

| | Examples | | | | |
|---|---|---|---|---|---|
| BUNA AP | 447 | 407 | 307 | 451 | 321 |
| | 1 | 2 | 3 | 4 | 5 |
| Ethylene (parts by weight) | 67 | 70 | 72 | 60 | 55 |
| Propylene (parts by weight) | 27 | 30 | 28 | 35 | 40 |
| Tercomponent | EN* | — | — | EN* | DCP** |
| Quantity corresponding to double bonds/1000 C. | 12 | 0 | 0 | 16 | 8 |
| Mooney viscosity ML-4/100° C. | 85 | 85 | 65 | 90 | 70 |
| Minimal sequence length | 10 | 10 | 12 | statistical type | statistical type |
| Crude strength (MPa) | 12.0 | 10.0 | 12.0 | 0.2 | 0.15 |

*EN = ethylidene norbornene;
**DCP = dicyclopentadiene

The physical properties determined are set out in Table 2:

Table 2
Test conditions: standard ring I (DIN 53 504)
Mechanical properties of the products

| | 1 | 2 | 3 | 4 | 5 |
|---|---|---|---|---|---|
| Tensile strength (MPa) | 12.4 | 8.8 | 10.6 | 5.9 | 5.8 |
| Elongation at break (%) | 370 | 160 | 320 | 135 | 80 |
| Modulus 100% (MPa) | 8.4 | 8.4 | 9.2 | 5.9 | — |
| Modulus 300% (MPa) | 11.4 | — | 10.5 | — | — |
| Hardness 23° C (Shore A) | 93 | 92 | 92 | 91 | 93 |
| Shock elasticity 23° C. (%) | 39 | 46 | 46 | 41 | 40 |
| Shock elasticity 70° C. (%) | 48 | 48 | 48 | 46 | 46 |
| Structural strength according to Pohle (N) | 205 | 230 | 265 | 165 | 165 |

Examples 4 and 5 are Comparison Examples. The improvement in the tensile strength and elongation at break values in Examples 1 to 3 (sequential EPDM) over the EPDM-types with statistical distribution (Examples 4 and 5) is clearly apparent.

EXAMPLE 6

| Component composition | Parts by weight |
|---|---|
| EPDM-sequential polymer (characterisation, cf. Example 7) | 60 |
| Isotactic polypropylene | 40 |
| 1,3-bis-(tert.-butyl-peroxyisopropyl)-benzene | 0.3 |
| Stabiliser - tris-nonylphenyl phosphite | 1.0 |

Production of the mixture in a KG 50 kneader (60 l)

Filling level 110%
Kneader temperature 130° C
Rotational speed of blades 40 rpm

| Mixing sequence | Parts by weight |
|---|---|
| EPDM-sequential polymer + isotactic polypropylene | 0 mins. |
| ⅓ peroxide | after 5 mins. |
| ⅓ peroxide | after 6 mins. |
| ⅓ peroxide + stabiliser | after 7 mins. |
| Kneader emptying | after 12 mins. |

-continued

| | |
|---|---|
| Batch temperature after 12 mins. = 200° C | |
| Homogenisation on industrial mixing rolls | |
| (Roll diameter 665 mm; roll length: 1800 mm) | |
| Temperature (° C.) | 190 |
| Rotational speed (rpm) | 13.5 |
| Friction | 1 : 1.11 |
| Rough sheet formation (mins.) | 2 |
| Homogenisation time (mins.) | 5 |
| Mechanical properties | |
| Tensile strength (MPa) | 9.4 |
| Elongation at break (%) | 445 |
| modulus 100% (MPa) | 6.7 |
| Modulus 300% (MPa) | 8.6 |
| Hardness 23° C. (Shore A) | 90 |
| Shock elasticity 23° C. (%) | 40 |
| Shock elasticity 70° C. (%) | 43 |
| Structural strength according to Pohle (N) | 181 |

EXAMPLES 7 AND 8

| Characteristics of the EPDM-sequential polymer used | | |
|---|---|---|
| Ethylene (parts by weight) | | 67 |
| Propylene (parts by weight) | | 27 |
| Tercomponent | | EN |
| Double bonds/1000 C | | 12 |
| Mooney viscosity (ML-4/100° C.) | | 85 |
| Minimal sequence length | | 10 |
| Crude strength (MPa) | | 12 |
| Component-composition: | Example 7 | Example 8 |
| | Parts by weight | |
| EPDM-sequential polymer | 60 | 50 |
| Isotactic polypropylene | 40 | 50 |
| 1,3-bis-(tert.-butyl-peroxy-isopropyl)-benzene | 0.3 | 0.3 |
| Stabiliser - tris-nonyl phenyl phosphite | 1.0 | 1.0 |

Production of mixture:

| Mixing sequence on laboratory mixing rolls | |
|---|---|
| Roll diameter (mm) | 200 |
| Working width (mm) | 450 |
| Roll temperature (° C.) | 40 |
| EPDM-sequential polymer | 0 mins. |
| Peroxide | after 3 mins. |
| Mixing time | 6 mins. |
| Further processing in a GK 2 kneader (volume 2.4 l, 40 rpm, 150° C.) | |

| | Example | |
|---|---|---|
| | 7 | 8 |
| EPDM-sequential polymer + peroxide | 0 min. | 0 min. |
| Isotactic polypropylene | after 1 min. | after 1 min. |
| Kneader emptying | after 8 mins. | after 8 mins. |
| Batch temperature (° C.) | 210 | 218 |
| Homogenisation on laboratory mixing rolls | Example | |
| | 7 | 8 |
| Roll diameter (mm) | 200 | 200 |
| Working width (mm) | 450 | 450 |
| Roll temperature (° C.) | cold | cold |
| Roll speed (rpm) | 24 | 24 |
| Friction | 1 : 1.15 | 1 : 1.15 |
| Rough sheet formation (mins.) | immediate | immediate |
| Homogenisation time (mins.) | 0.5 | 0.5 |
| Batch temperature (° C.) | 170 | 160 |
| Mechanical properties | Example | |
| | 7 | 8 |
| Tensile strength (MPa) | 9.0 | 10.2 |
| Elongation at break (%) | 250 | 220 |
| Modulus 100% (MPa) | 8.0 | 9.1 |
| Modulus 300% (MPa) | — | — |
| Hardness 23° C. (Shore A) | 90 | 94 |
| Shock elasticity 23° C. (%) | 40 | 37 |
| Shock elasticity 70° C. (%) | 46 | 42 |
| Structural strength according to Pohle (N) | 200 | 180 |

EXAMPLE 9

| | |
|---|---|
| Characteristic of the EPDM-sequential polymer used | |
| Ethylene (parts by weight) | 67 |
| Propylene (parts by weight) | 27 |
| Tercomponent | EN |
| Quantity corresponding to double bonds/1000 C | 12 |
| Mooney viscosity (ML-4/100° C.) | 85 |
| Minimal sequence length | 10 |
| Crude strength (MPa) | 12 |
| Component composition | Parts by weight |
| EPDM-sequential polymer | 40 |
| Isotactic polypropylene | 60 |
| 1,3-bis-(tert.-butyl-peroxyisopropyl)-benzene | 0.3 |
| Stabiliser | 1.0 |
| Production in a mixing extruder (double-shaft screw) | |
| Machinedata | |
| Screw length | 12 D |
| Screw speed (rpm) | 300 |
| Mixing temperature (° C.) | 160 |
| Throughput (K/h) | 100 |
| Production plan | |

| | |
|---|---|
| Mechanical properties | |
| Tensile strength (MPa) | 9.8 |
| Elongation at break (%) | 265 |
| Modulus 100% (MPa) | 8.4 |
| Modulus 300% (MPa) | — |
| Hardness 23° C. (Shore A) | 93 |
| Shock elasticity 23° C. (%) | 38 |
| Shock elasticity 70° C. (%) | 44 |
| Structural strength according to Pohle (N) | 215 |

The physical properties quoted in the Tables were determined in accordance with the following Specifications:

| | | |
|---|---|---|
| Tensile strength | (MPa) | DIN 53 504 standard ring I |
| Elongation at break | (%) | |
| Modulus | (MPa) | |
| Hardness | (Shore A) | DIN 53 505 |
| Shock elasticity | (%) | DIN 53 512 |
| Structural strength | (N) | according to Pohle |

We claim:
1. Mixtures of 10–95% by weight of polyolefin resin and 90–5% of partially crystalline, partially crosslinked sequential polymers of ethylene-propylene or ethylene-propylene-diene.

2. Mixtures as claimed in claim 1, wherein polypropylene or polyethylene of low or high density is used as the polyolefin resin.

3. Mixtures as claimed in claim 1, wherein isotactic polypropylene of high crystallinity is used as the polyolefin resin.

4. Mixtures as claimed in claim 1, wherein ethylene-propylene or ethylene-propylene-diene sequential polymers consisting of
   63 to 95 parts by weight of ethylene,
   5 to 37 parts by weight of propylene and
   0 to 15 parts by weight of tercomponent are used.

5. Mixtures as claimed in claim 4, wherein ethylene-propylene or ethylene-propylene-diene sequential polymers consisting of
   70 to 85 parts by weight of ethylene,
   15 to 30 parts by weight of propylene and
   5 to 10 parts by weight tercomponent are used.

6. Mixtures as claimed in claim 1, wherein ethylene-propylene-diene sequential polymers, in which the diene component is dicyclopentadiene or ethylidene norbornene, are used.

7. A process for producing the mixtures claimed in claim 1, wherein either
   a. ethylene-propylene or ethylene-propylene-diene sequential polymer partially crosslinked with peroxidic crosslinking agents is mixed with polyolefin resins, the partial crosslinking step having been carried out with 0.05 to 10% by weight of crosslinking agent at temperatures of from 150° to 250° C., or
   b. polyolefin resins and ethylene-propylene or ethylene-propylene-diene sequential polymer are mixed and the mixture thus obtained is partially crosslinked under the conditions of alternative a).

8. The use of mixtures according to claim 1 as thermoplastic rubber compositions for production of shaped articles by molding or extrusion.